United States Patent [19]

Choi

[11] Patent Number: 5,981,640

[45] Date of Patent: Nov. 9, 1999

[54] LASER MARKABLE ACRYLONITRILE-BUTADIENE-STYRENE POLYMER FOR TELECOMMUNICATIONS TERMINALS AND KEYPADS

[75] Inventor: Jae Hong Choi, Carmel, Ind.

[73] Assignee: Lucent Technologies Inc., Murray Hill, N.J.

[21] Appl. No.: 09/127,283

[22] Filed: Jul. 31, 1998

[51] Int. Cl.$^6$ ........................................................ C08K 3/00
[52] U.S. Cl. .......................... 524/424; 524/430; 524/432; 524/433; 524/492; 524/493; 524/495
[58] Field of Search .................... 524/424, 430, 524/432, 433, 492, 493, 495

[56] References Cited

U.S. PATENT DOCUMENTS 5,760,126  6/1998  Itoh et al. ................................ 524/431
5,840,791  11/1998  Magerstedt et al. ..................... 524/405
5,866,644  2/1999  Mercx et al. ............................ 524/417

*Primary Examiner*—Edward J. Cain
*Attorney, Agent, or Firm*—Jeffery J. Brosemer

[57] ABSTRACT

A laser markable Acrylonitrile-Butadiene-Styrene (ABS) terpolymer formulation suitable for a number of applications and in particular, telecommunications terminals and keypads. The ABS terpolymer comprises Acrylonitrile (20–24%), Butadiene (14–17%), Styrene (59–63%), Medium Color Furnace Black (0.008–0.015 PPH), Iron Oxide Red (0.003–0.005 PPH), Titanium Dioxide (0.6–3.50 PPH), Silicon Dioxide (0.07–0.2 PPH), Zinc Carbonate (0.05–0.70 PPH) and Aluminum Hydroxide (0.05–0.25 PPH). The ABS so produced is characterized by desirable performance characteristics, e.g., mechanical strength, impact resistance, gloss, stain resistance, molding processing properties and color, as defined in a 3D color system of the color value (L-star (=67.53)), hue (a-star (=1.15)), chroma (b-star (=3.46)).

3 Claims, 4 Drawing Sheets

LASER MARKABLE ACRYLONITRILE-BUTADIENE-STYRENE POLYMER FOR TELECOMMUNICATIONS TERMINALS AND KEYPADS

FIELD OF THE INVENTION

The present invention relates generally to the field of polymer sciences and in particular to a laser markable Acrylonitrile-Butadiene-Styrene (ABS) polymer suitable for telecommunications terminals and keypads.

BACKGROUND OF THE INVENTION

Polymers based upon Acrylonitrile-Butadiene-Styrene (ABS) formulations have found widespread use in contemporary society due to a number of useful properties. Specifically, and depending upon the particular formulation, ABS exhibits good impact strength—even at low temperatures, is stiff and dimensionally stable, can be made with an aesthetic finish and is relatively easy to machine. When UV-stabilizers are added to ABS formulations, the resulting ABS may be well suited for outdoor applications.

Numerous products incorporating ABS require graphical elements, i.e., alphanumeric graphics on dial keypad buttons. Methods that are currently employed to impart such graphical elements to ABS structures include, 2-shot injection molding, dye-sublimation and laser marking. Each of these methods is characterized by numerous advantages and disadvantages and the effectiveness of each is dependent upon particular ABS formulation used.

It is evident from this background then that alternative ABS formulations and approaches to graphically marking products constructed from same are required.

SUMMARY OF THE INVENTION

I have discovered a laser markable Acrylonitrile-Butadiene-Styrene (ABS) terpolymer formulation suitable for a number of applications and in particular, telecommunications terminals and keypads. The ABS terpolymer comprises Acrylonitrile (20–24%), Butadiene (14–17%), Styrene (59–63%), Medium Color Furnace Black (0.008–0.015 PPH), Iron Oxide Red (0.003–0.005 PPH), Titanium Dioxide (0.6–3.50 PPH), Silicon Dioxide (0.07–0.2 PPH), Zinc Carbonate (0.05–0.70 PPH) and Aluminum Hydroxide (0.05–0.25 PPH). The ABS so produced is characterized by desirable performance characteristics, e.g., mechanical strength, impact resistance, gloss, stain resistance, molding processing properties and color, as defined in a 3D color system of the color value (L-star (=67.53)), hue (a-star (=1.15)), chroma (b-star(=3.46)).

Further features and advantages of the present invention, as well as the structure and operation of various embodiments of the present invention are described in detail below with reference to the accompanying drawing.

DETAILED DESCRIPTION OF THE INVENTION

ABS terpolymer is derived from the copolymerization of styrene and acrylonitrile (SAN) followed by grafting butadiene onto the SAN copolymer backbone chain. The chemical structure of ABS terpolymer so constructed is:

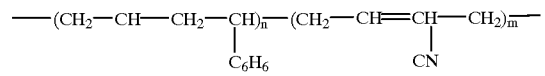

where n and m represent the repeating units of the monomers, which in turn determine the molecular weight of the terpolymer.

Those skilled in the art will appreciate that homopolymer composition of the ABS formulation may be determined by a variety of means, e.g., Fourier Transform Infrared Spectroscopy (FT-IR). A useful composition for the present invention is:

| Homopolymer Composition in ABS Terpolymer | |
|---|---|
| Homopolymer | Composition (%) |
| Acrylonitrile | 20–24 |
| Butadiene | 14–17 |
| Styrene | 59–63 |

This homopolymer composition is found to produce an ABS terpolymer exhibiting a range of useful and desirable properties namely, mechanical strength, impact resistance, gloss of finish, stain resistance and favorable molding properties. The ABS so formulated is substantially translucent (milky white) and may be advantageously color matched to any of a number of colors, and in particular to a desirable light gray as defined in a 3D color system of the color value (L-star(67.53)), hue(a-star(1.15)), chroma(b-star(3.46)) where a-star and b-star indicate two color axes with a-star as the red-green axis and b-star is the yellow-blue axis.

When so formulated, the ABS terpolymer has the following composition:

| Terpolymer Composition | |
|---|---|
| Component | Composition (PPH of Terpolymer) |
| Terpolymer | 100.00–100.00 |
| Medium Color Furnace Black | 0.008–0.015 |
| Iron Oxide Red | 0.003–0.005 |
| Titanium Dioxide | 0.6–3.50 |
| Silicon Dioxide | 0.07–0.2 |
| Zinc Carbonate | 0.05–0.70 |
| Aluminum Hydroxide | 0.05–0.25 |

Figure 1:
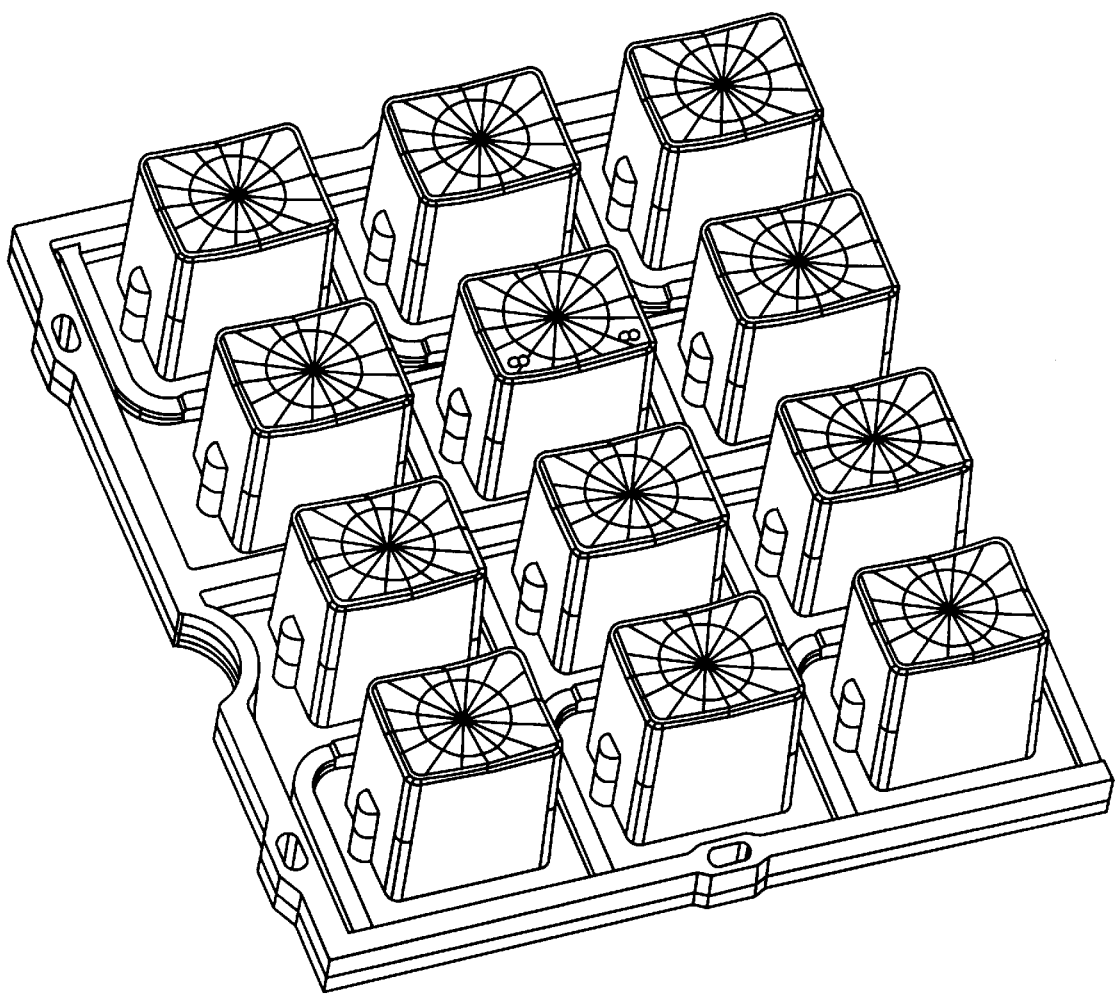
FIG. 1 shows a telecommunications numeric keypad suitable for constructed according to the present invention.

The ABS formulation was molded into a telecommunications keypad as shown in FIG. 1. A 4 cavity mold, specifically designed for the keypad was used and the ABS in Zone 1 was molded at 420° F., Zone 2 was molded at 440° F., Zone 3 was molded at 450° F., and Nozzle molded at 470° F. which remains the same temperature as the molten polymer thereby avoiding thermal degradation. The mold was 80° F. and the molded terpolymer was dried for 4 hours at 190° F. Those skilled in the art will of course know that ABS molding techniques are well-known, and that the degree to which the mold is filled may be monitored, for example, by measuring a pressure of the mold cavity during molding.

Once the ABS is dried, it may be marked. The laser source employed for this marking was a known, solid-state Neodymium:Yttrium Aluminum Garnet (Nd:YAG) laser operating at 1064 nm. A 254 mm lens having an aperture of 1.4 mm was selected as well.

Figure 2:
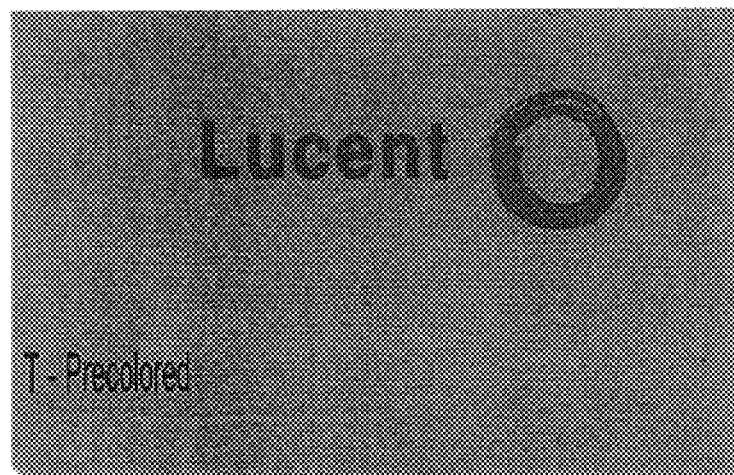
FIG. 2 shows the effect of polymer and pigmentation on marking contrast.
Figure 2:
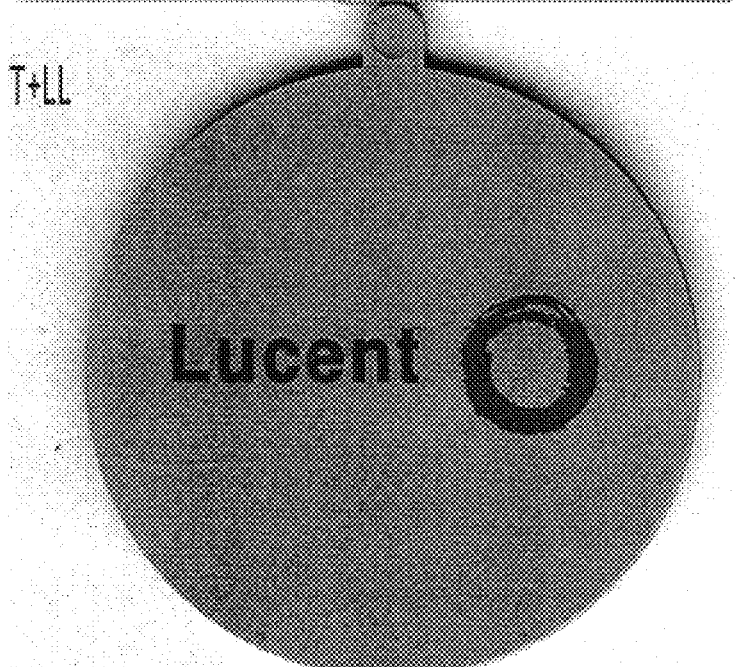
Figure 2:
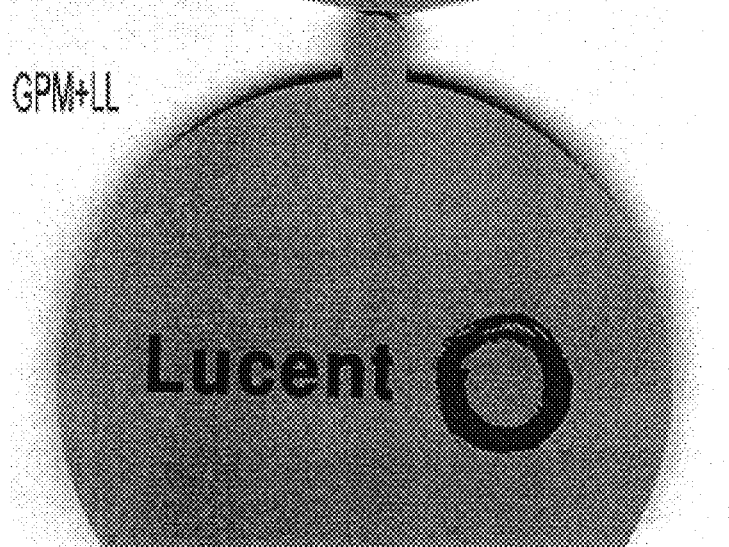
Figure 3:
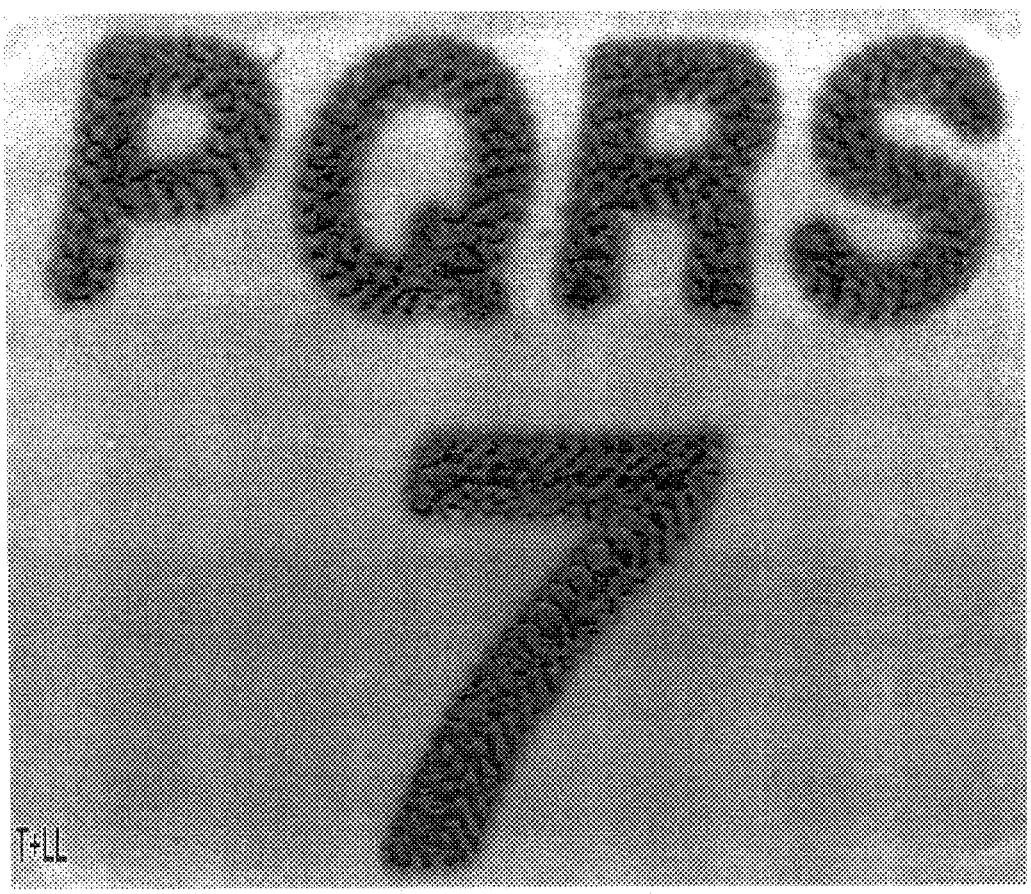
FIG. 3 shows a telecommunications numeric keypad constructed and laser marked according to the present invention.
Figure 4:
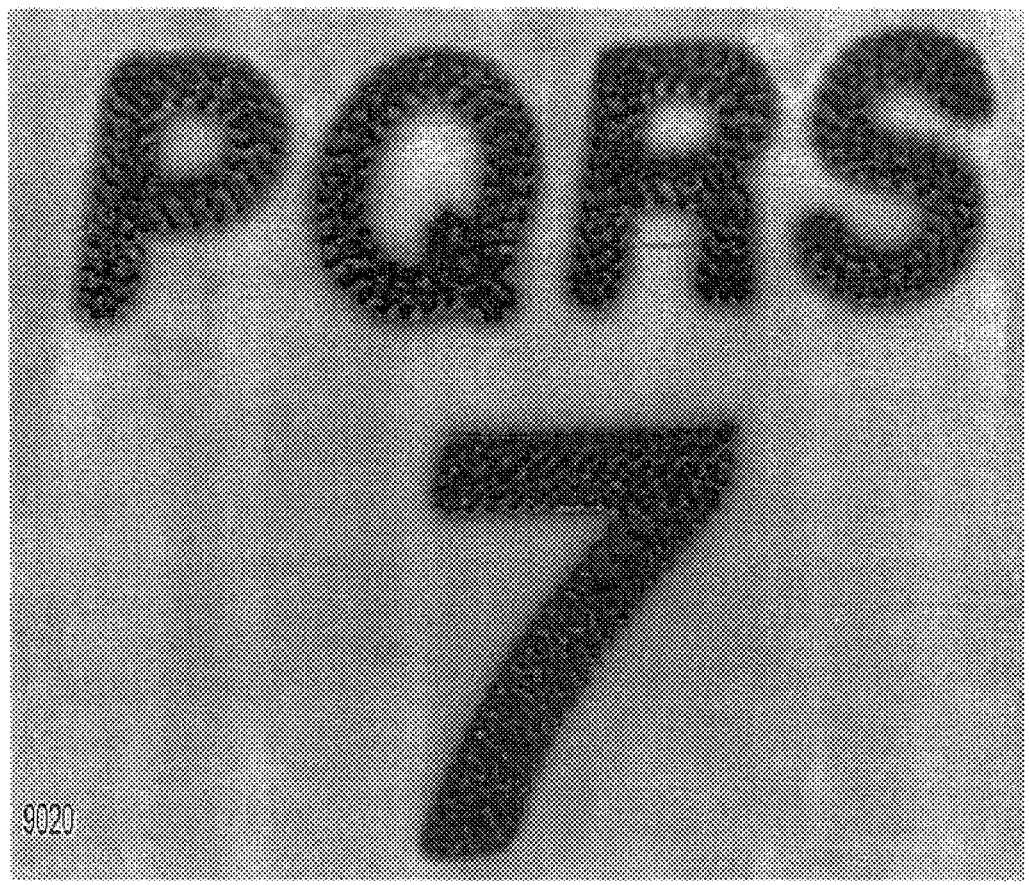
FIG. 4 shows a telecommunications numeric keypad constructed and laser marked according to the present invention.

Test coupons were prepared to determine initial laser writing parameters, e.g., fill density, speed, lamp current, line width, frequency and beam expansion. With reference now to FIG. 2, there is illustrated the effect of polymer and pigmentation on the marking contrast difference at the same marking conditions. To aid in the formulation development more accurately and to further understand the laser writing mechanism of a molded keypad surface, the marking area was magnified by magnifying the laser burning area as shown in FIG. 3 and FIG. 4.

Subsequent to marking, a Taber Abrasion Tester and solvent resistance was evaluated in an attempt to determine durability of the laser writing. As those skilled in the art will quickly appreciate, keypads used in telecommunications terminals must endure constant and repeated direct touch by consumers and unexpectedly harsh environmental conditions. Consequently, durability is an important characteristic of these terminals and ones constructed accorded to the present invention performed satisfactorily.

It was determined that ABS with less opacity produced better laser marking contrast and resolution. For example:

| Relative Opacity of Commercial Polymer | |
|---|---|
| Polymer | Relative Opacity |
| Cycolac T (GE) | most translucent |
| Cycolac GPM5500 (GE) | translucent |
| Magnum 9020 (GB) | slightly less translucent |
| GTM5300(GE) | transparent |
| Novodur P2H (Bayer) | slightly less translucent |

The opacity is affected by the polymerization of the terpolymer which affects the dispersion and size of the butadiene. Terpolymers with more evenly dispersed and smaller butadiene particles are less translucent and laser marking of such terpolymers is more resolved with higher contrast. Further, terpolymers having lower acrylonitrile concentrations are less translucent and exhibit enhanced laser marking characteristics. Magnum 9020, Novodur P2H and Cycolac GPM5500 all have lower acrylonitrile levels than Cycolac T.

Finally, it was determined that variations in Titanium Dioxide concentration had a pronounced effect on UV-stability and laser writing characteristics. Specifically, formulations having titanium dioxide concentrations greater than approximately 3.5 PPH did not produce a laser marking with sufficiently high contrast. Formulations having titanium dioxide concentrations less than approximately 0.6 PPH exhibited an unacceptably high surface roughness.

Various additional modifications of this invention will occur to those skilled in the art. Nevertheless, all deviations from the specific teachings of this specification that basically rely upon the principles and their equivalents through which the art has been advanced are properly considered within the scope of the invention as described and claimed.

The invention claimed is:

1. A laser markable, Acrylonitrile-Butadiene-Styrene (ABS) polymer comprising: 20 to 24% by weight Acrylonitrile, 14 to 17% by weight Butadiene, and 59 to 63% by weight Styrene, and medium color furnace black, iron oxide red, titanium dioxide, silicon dioxide, zinc carbonate and aluminum hydroxide.

2. The laser markable ABS polymer of claim 1 wherein the concentration of the medium color furnace black is substantially 0.008 to 0.015 PPH, the concentration of the iron oxide red is substantially 0.003 to 0.005 PPH, the concentration of the titanium dioxide is substantially 0.6 to 3.50 PPH, the concentration of the silicon dioxide is 0.07 to 0.2 PPH, the concentration of the zinc carbonate is substantially 0.05 to 0.7 PPH and the concentration of the aluminum oxide is substantially 0.05 to 0.25.

3. The laser markable ABS polymer of claim 2 exhibiting a color notation of 67.53 L-star; 1.15 a-star, and 3.46 b-star.

* * * * *